United States Patent
Cao et al.

(10) Patent No.: US 10,594,229 B2
(45) Date of Patent: Mar. 17, 2020

(54) POWERED DEVICE (PD) WITH SIMPLIFIED RECTIFIER CIRCUIT

(71) Applicant: Huawei Technologies Co., Ltd., Shenzhen (CN)

(72) Inventors: Jincan Cao, Nanjing (CN); Xuefeng Tang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/425,528

(22) Filed: May 29, 2019

(65) Prior Publication Data

US 2019/0372475 A1  Dec. 5, 2019

(30) Foreign Application Priority Data

May 30, 2018  (CN) .......................... 2018 1 0542835

(51) Int. Cl.
| | |
|---|---|
| *H02M 7/217* | (2006.01) |
| *H01R 13/66* | (2006.01) |
| *H01R 24/64* | (2011.01) |
| *H04L 12/10* | (2006.01) |
| *H01R 107/00* | (2006.01) |

(52) U.S. Cl.
CPC ........ *H02M 7/217* (2013.01); *H01R 13/6675* (2013.01); *H01R 24/64* (2013.01); *H04L 12/10* (2013.01); *H01R 2107/00* (2013.01)

(58) Field of Classification Search
CPC ............... H02M 7/217; H02M 3/1588; H02M 3/33592; H02M 7/28; H04L 12/10; H01R 13/6675; H01R 24/64

See application file for complete search history.

(56) References Cited

U.S. PATENT DOCUMENTS

| | | | | |
|---|---|---|---|---|
| 5,636,116 | A  * | 6/1997 | Milavec ............ | H02M 3/33592 363/127 |
| 7,956,550 | B2 * | 6/2011 | Nerone .............. | H05B 41/2827 315/224 |
| 8,013,466 | B1 * | 9/2011 | Thompson ................ | H02J 1/00 307/1 |
| 9,729,081 | B1 * | 8/2017 | Zou ........................ | H02M 7/219 |
| 10,334,635 | B2 * | 6/2019 | Hillier ..................... | H04L 12/10 |
| 2006/0117089 | A1 * | 6/2006 | Karam ...................... | H04L 1/22 709/208 |
| 2006/0218421 | A1 * | 9/2006 | Camagna ................ | H04L 12/10 713/300 |
| 2006/0238252 | A1 * | 10/2006 | Crawley ................. | H04L 12/12 330/253 |

(Continued)

OTHER PUBLICATIONS

Foreign Communication From a Counterpart Application, European Application No. 19177315.9, Extended European Search Report dated Sep. 10, 2019, 10 pages.

(Continued)

*Primary Examiner* — Yusef A Ahmed
(74) *Attorney, Agent, or Firm* — Conley Rose, P.C.

(57) ABSTRACT

In a powered device (PD), four MOSFETs are used in a rectifier circuit. The four MOSFETs are disposed based on a premise that an electric potential of a contact pair 1-2 is lower than that of a contact pair 3-6 and an electric potential of a contact pair 7-8 is lower than that of a contact pair 4-5, so that a PoE current of each contact group passes through only two of the MOSFETs but does not pass through a diode.

20 Claims, 5 Drawing Sheets

(56) References Cited

U.S. PATENT DOCUMENTS

| | | | | |
|---|---|---|---|---|
| 2007/0236853 A1* | 10/2007 | Crawley | H04L 12/10 | 361/119 |
| 2007/0263675 A1* | 11/2007 | Lum | H04L 12/10 | 713/300 |
| 2008/0074906 A1* | 3/2008 | Tsai | H04L 12/10 | 363/21.01 |
| 2008/0136256 A1* | 6/2008 | Gattani | H04L 12/66 | 307/2 |
| 2009/0228721 A1* | 9/2009 | Karam | H04L 12/10 | 713/300 |
| 2010/0153751 A1* | 6/2010 | Tseng | H04L 12/40032 | 713/300 |
| 2010/0188876 A1* | 7/2010 | Garrity | H02M 1/4225 | 363/127 |
| 2011/0075460 A1* | 3/2011 | Sells | H02M 1/08 | 363/127 |
| 2013/0016545 A1* | 1/2013 | Xu | H02M 1/44 | 363/126 |
| 2013/0039362 A1* | 2/2013 | Emmanuel | H04L 1/0035 | 370/352 |
| 2013/0154348 A1* | 6/2013 | Hongo | H04B 3/54 | 307/1 |
| 2014/0085948 A1* | 3/2014 | Huynh | H02M 7/219 | 363/80 |
| 2014/0140102 A1* | 5/2014 | Duan | H03K 17/691 | 363/16 |
| 2014/0164795 A1* | 6/2014 | Wright | H04L 12/10 | 713/300 |
| 2014/0177305 A1* | 6/2014 | Irish | H02M 7/217 | 363/127 |
| 2014/0258738 A1* | 9/2014 | Greenwalt | G06F 1/3206 | 713/300 |
| 2015/0130269 A1* | 5/2015 | Barrass | H02J 4/00 | 307/1 |
| 2015/0194906 A1* | 7/2015 | Yedinak | H02M 7/23 | 363/126 |
| 2015/0222125 A1* | 8/2015 | Brunker | H01R 13/6633 | 307/42 |
| 2016/0056967 A1* | 2/2016 | Ohana | G06F 1/26 | 307/1 |
| 2016/0330772 A1* | 11/2016 | Hillier | H04L 12/40045 | |
| 2017/0041153 A1* | 2/2017 | Picard | H02J 4/00 | |
| 2017/0207213 A1* | 7/2017 | Sugimachi | G01R 31/42 | |
| 2017/0288535 A1* | 10/2017 | Wendt | H02M 1/108 | |
| 2017/0338969 A1* | 11/2017 | Paul | H04L 12/10 | |
| 2018/0026635 A1* | 1/2018 | Yan | H03K 19/017518 | 327/333 |
| 2019/0120891 A1* | 4/2019 | Ysebodt | G01R 31/045 | |
| 2019/0372788 A1* | 12/2019 | Cao | H04L 12/10 | |

OTHER PUBLICATIONS

"Part 3: Carrier Sense Multiple Access with Collision Detection (CSMA/CD) Access Method and Physical Layer Specifications, Amendment: Data Terminal Equipment (DTE) Power via Media Dependent Interface (MDI)," IEEE Std 802.3af™, Jun. 18, 2003, 133 pages.

"Part 3: Carrier Sense Multiple Access with Collision Detection (CSMA/CD) Access Method and Physical Layer Specifications, Amendment 3: Data Terminal Equipment (DTE) Power via the Media Dependent Interface (MDI) Enhancements," IEEE Std 802.3at™, Oct. 30, 2009, 141 pages.

"Draft Standard for Ethernet Amendment 2: Power over Ethernet over 4 Pairs," IEEE P802.3BT/D3.4, Mar. 26, 2018, 316 pages.

* cited by examiner

POWERED DEVICE (PD) WITH SIMPLIFIED RECTIFIER CIRCUIT

CROSS-REFERENCE TO RELATED APPLICATIONS

This application claims priority to Chinese Patent App. No. 201810542835.8 filed on May 30, 2018, which is incorporated by reference.

TECHNICAL FIELD

This application relates to the communications field, and in particular, to a powered device.

BACKGROUND

Figure 1:
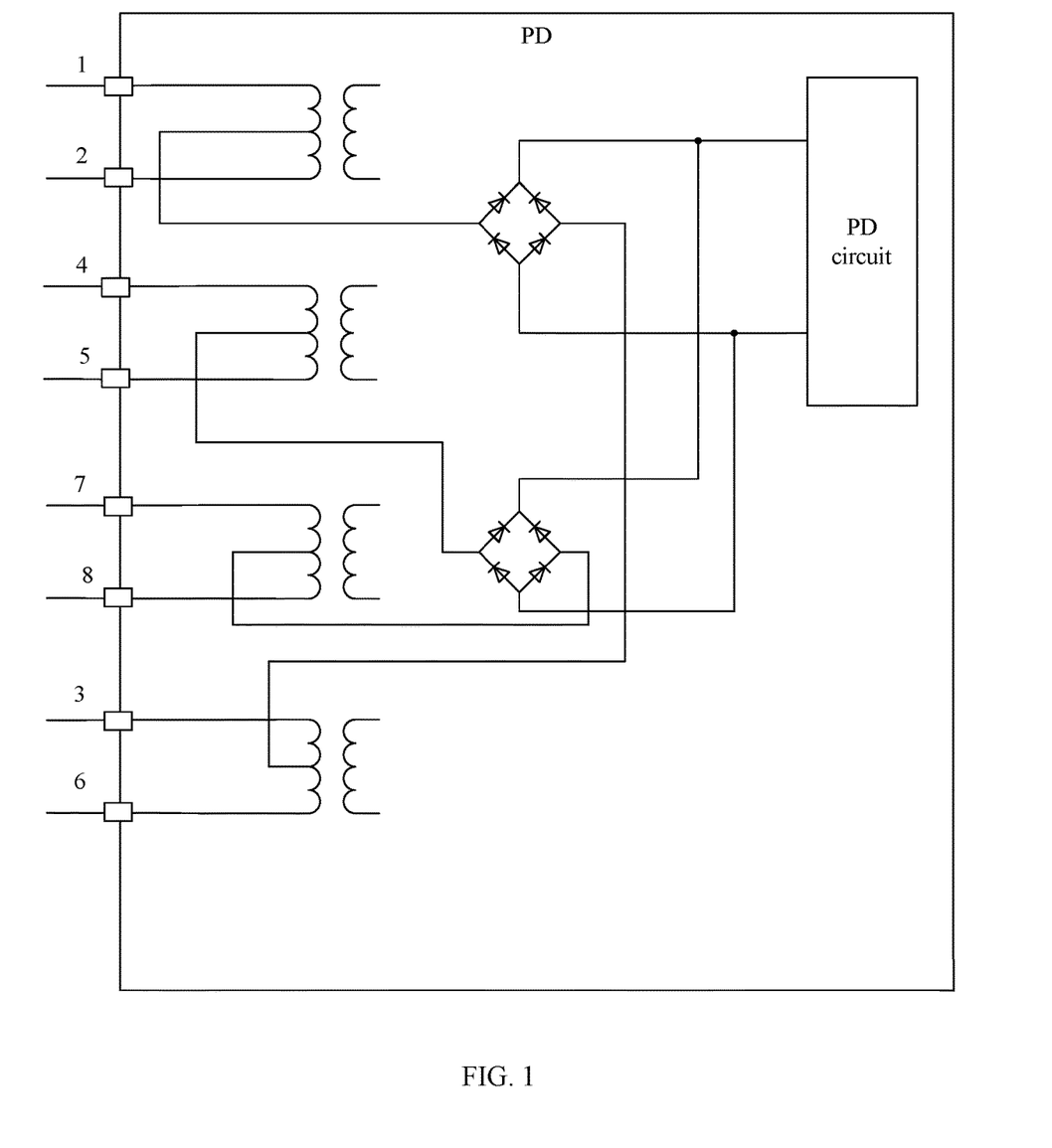
FIG. 1 shows a structure of a PD.

A Power over Ethernet (PoE) system includes power sourcing equipment (PSE) and a powered device (PD). The PSE supplies power to the PD while communicating with the PD through an Ethernet twisted pair. The Ethernet twisted pair includes eight cables numbered 1 to 8. A cable 1 and a cable 2 are paired, a cable 3 and a cable 6 are paired, a cable 4 and a cable 5 are paired, and a cable 7 and a cable 8 are paired. Two paired cables are twisted together. In a widely used 100 M Ethernet, a cable pair 1-2 and a cable pair 3-6 are used for communication, and a cable pair 4-5 and a cable pair 7-8 are idle. Therefore, the cable pair 1-2 and the cable pair 3-6 form a group, and the cable pair 4-5 and the cable pair 7-8 form another group. A data cable pair group (a cable pair 1-2 and a cable pair 3-6) is usually used for early Power over Ethernet supply. Two groups of cable pairs can be used together for new Power over Ethernet supply. FIG. 1 shows a structure of a PD. The PD in FIG. 1 uses a diode full-bridge rectifier circuit.

A power loss of diodes is large. Therefore, power utilization of the PD is low.

SUMMARY

This application provides a PD to improve power utilization of the PD.

According to a first aspect, a PD is provided. The PD includes an Ethernet port, a rectifier circuit, and a PD circuit. The Ethernet port includes a first contact pair, a second contact pair, a third contact pair, and a fourth contact pair. The first contact pair is configured to connect to a cable pair 1-2 of an Ethernet cable. The second contact pair is configured to connect to a cable pair 3-6 of the Ethernet cable. The third contact pair is configured to connect to a cable pair 4-5 of the Ethernet cable. The fourth contact pair is configured to connect to a cable pair 7-8 of the Ethernet cable. The rectifier circuit includes four metal-oxide-semiconductor field-effect transistors (MOSFETs) and at least four diodes. The four MOSFETs are a first MOSFET, a second MOSFET, a third MOSFET, and a fourth MOSFET. The at least four diodes include a first diode, a second diode, a third diode, and a fourth diode. The first contact pair is connected to an anode of the first diode, and is connected to a first end of the first MOSFET. The second contact pair is connected to a cathode of the second diode, and is connected to a first end of the second MOSFET. The third contact pair is connected to a cathode of the third diode, and is connected to a first end of the third MOSFET. The fourth contact pair is connected to an anode of the fourth diode, and is connected to a first end of the fourth MOSFET. A power input positive electrode of the PD circuit is connected to a cathode of the first diode, is connected to a second end of the second MOSFET, is connected to a second end of the third MOSFET, and is connected to a cathode of the fourth diode. A power input negative electrode of the PD circuit is connected to a second end of the first MOSFET, is connected to an anode of the second diode, is connected to an anode of the third diode, and is connected to a second end of the fourth MOSFET.

That an electric potential of the contact pair 1-2 is lower than that of the contact pair 3-6 and an electric potential of the contact pair 7-8 is lower than that of the contact pair 4-5 is a most widely used PoE scenario. In the foregoing scenario, the first diode to the fourth diode in the PD are cut off. Therefore, because a current passes through only the MOSFETs but does not pass through the diodes, a loss of the rectifier circuit of the PD is small. Compared with a rectifier circuit in which eight MOSFETs are used, the foregoing structure reduces complexity and costs of the PD when there is a same power loss.

With reference to the first aspect, in a first implementation of the first aspect, a gate electrode of the first MOSFET is connected to the second contact pair. A gate electrode of the second MOSFET is connected to the first contact pair. A gate electrode of the third MOSFET is connected to the fourth contact pair. A gate electrode of the fourth MOSFET is connected to the third contact pair.

With reference to the first aspect or the first implementation of the first aspect, in a second implementation of the first aspect, the first MOSFET is an N-type MOSFET. The second MOSFET is a P-type MOSFET. The third MOSFET is a P-type MOSFET. The fourth MOSFET is an N-type MOSFET. When the electric potential of the contact pair 1-2 is lower than that of the contact pair 3-6 and the electric potential of the contact pair 7-8 is lower than that of the contact pair 4-5, the foregoing types of MOSFETs are used without additional drive circuits.

With reference to the first aspect, the first implementation of the first aspect, or the second implementation of the first aspect, in a third implementation of the first aspect, the first end of the first MOSFET is a drain electrode of the first MOSFET. The second end of the first MOSFET is a source electrode of the first MOSFET. The first end of the second MOSFET is a drain electrode of the second MOSFET. The second end of the second MOSFET is a source electrode of the second MOSFET. The first end of the third MOSFET is a drain electrode of the third MOSFET. The second end of the third MOSFET is a source electrode of the third MOSFET. The first end of the fourth MOSFET is a drain electrode of the fourth MOSFET. The second end of the fourth MOSFET is a source electrode of the fourth MOSFET.

With reference to any one of the first aspect or the first to the third implementations of the first aspect, in a fourth implementation of the first aspect, the rectifier circuit further includes a first control circuit and a second control circuit. The gate electrode of the first MOSFET is connected to the second contact pair through the first control circuit. The gate electrode of the fourth MOSFET is connected to the third contact pair through the second control circuit. The first control circuit is configured to: when a value obtained by subtracting an electric potential of the first contact pair from an electric potential of the second contact pair is greater than a first voltage threshold, turn on the first MOSFET; and when the value obtained by subtracting the electric potential of the first contact pair from the electric potential of the second contact pair is less than the first voltage threshold, cut off the first MOSFET. An absolute value of the first voltage threshold is greater than that of a maximum PoE detection voltage and less than or equal to that of a minimum PoE supply voltage. The second control circuit is configured to: when a value obtained by subtracting an electric potential of the fourth contact pair from an electric potential of the third contact pair is greater than a second voltage threshold, turn on the fourth MOSFET; and when the value obtained by subtracting the electric potential of the fourth contact pair from the electric potential of the third contact pair is less than the second voltage threshold, cut off the fourth MOSFET. An absolute value of the second voltage threshold is greater than that of the maximum PoE detection voltage and greater than or equal to that of the minimum PoE supply voltage. For the PD using the structure, a connection between the cable pair 4-5 and a backflow end in the PSE does not cause a detection or classification error.

With reference to any one of the first aspect or the first to the fourth implementations of the first aspect, in a fifth implementation of the first aspect, the PD is a type-4 PD. If the PD is a type-4 PD, the PSE works as type-4 PSE. The type-4 PSE definitely uses the cable pair 1-2 and the cable pair 7-8 for providing a low electric potential. Therefore, the structure of the PD is particularly suitable for the type-4 PD.

DESCRIPTION OF EMBODIMENTS

The following describes the embodiments of the disclosure with reference to FIG. 2 to FIG. 5.

A power loss of a MOSFET is lower than that of a diode. Therefore, a MOSFET may be used to replace a diode in FIG. 1. However, a structure of the MOSFET is more complex than that of the diode, and if eight MOSFETs are used to completely replace diodes in FIG. 1, a rectifier circuit of a PD has a complex structure and high costs.

Figure 2:
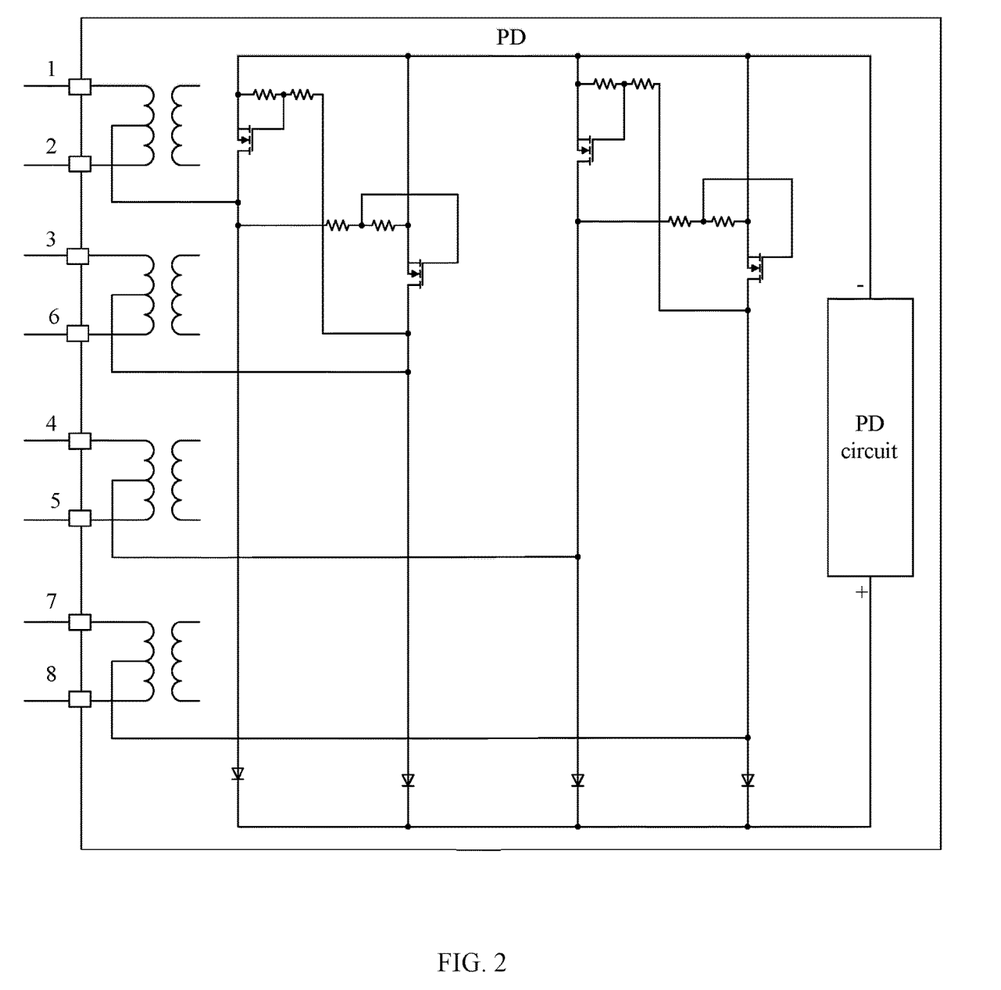
FIG. 2 shows another structure of a PD.

A compromise method is to use four MOSFETs to replace half of the diodes in FIG. 1. FIG. 2 shows a structure of a PD. As shown in FIG. 2, there are only four MOSFETs in a rectifier circuit of the PD, and therefore costs of the rectifier circuit are lower than that of a full-MOSFET rectifier circuit.

Eight contacts of an Ethernet port of the PD belong to a first contact group and a second contact group. The first contact group includes a contact pair 1-2 and a contact pair 3-6. The second contact group includes a contact pair 4-5 and a contact pair 7-8. The contact pair 1-2 is configured to connect to a cable pair 1-2 of an Ethernet cable. The contact pair 3-6 is configured to connect to a cable pair 3-6 of the Ethernet cable. The contact pair 4-5 is configured to connect to a cable pair 4-5 of the Ethernet cable. The contact pair 7-8 is configured to connect to a cable pair 7-8 of the Ethernet cable. In addition, when PSE uses a first cable pair group for power supply, regardless of which contact pair in the first contact group has a low electric potential, a current flows through a MOSFET and a diode in the rectifier circuit. Similarly, when the PSE uses a second cable pair group for power supply, regardless of which contact pair in the second contact group has a low electric potential, a current flows through a MOSFET and a diode in the rectifier circuit.

Therefore, a loss of the rectifier circuit of the PD shown in FIG. 2 is lower than that of the PD shown in FIG. 1.

However, the loss of the rectifier circuit of the PD shown in FIG. 2 is still higher than that of the full-MOSFET rectifier circuit. If the loss of the rectifier circuit can be decreased under a premise that a quantity of MOSFETs is not increased, the rectifier circuit of the PD can be optimized.

PoE requires that a PD can accept power supply of any polarity. PSE is probably a network device. A network device mostly uses a medium dependent interface crossover (MDI-X) port. PoE power supply polarity of the MDI-X port should satisfy that an electric potential of a cable pair 1-2 is lower than that of a cable pair 3-6. Early Power over Ethernet stipulates that an electric potential of a cable pair 7-8 is lower than that of a cable pair 4-5 in PSE. Although in a new Power over Ethernet system, PSE can provide power supply in which an electric potential of a cable pair 7-8 is higher than that of a cable pair 4-5, but the PSE has not been widely used actually. In addition, a crossover cable also has not been widely used. Therefore, based on a premise that an electric potential of the contact pair 1-2 is lower than that of the contact pair 3-6 and an electric potential of the contact pair 7-8 is lower than that of the contact pair 4-5, the rectifier circuit of the PD may be designed to adapt to a most widely used scenario.

Figure 3:
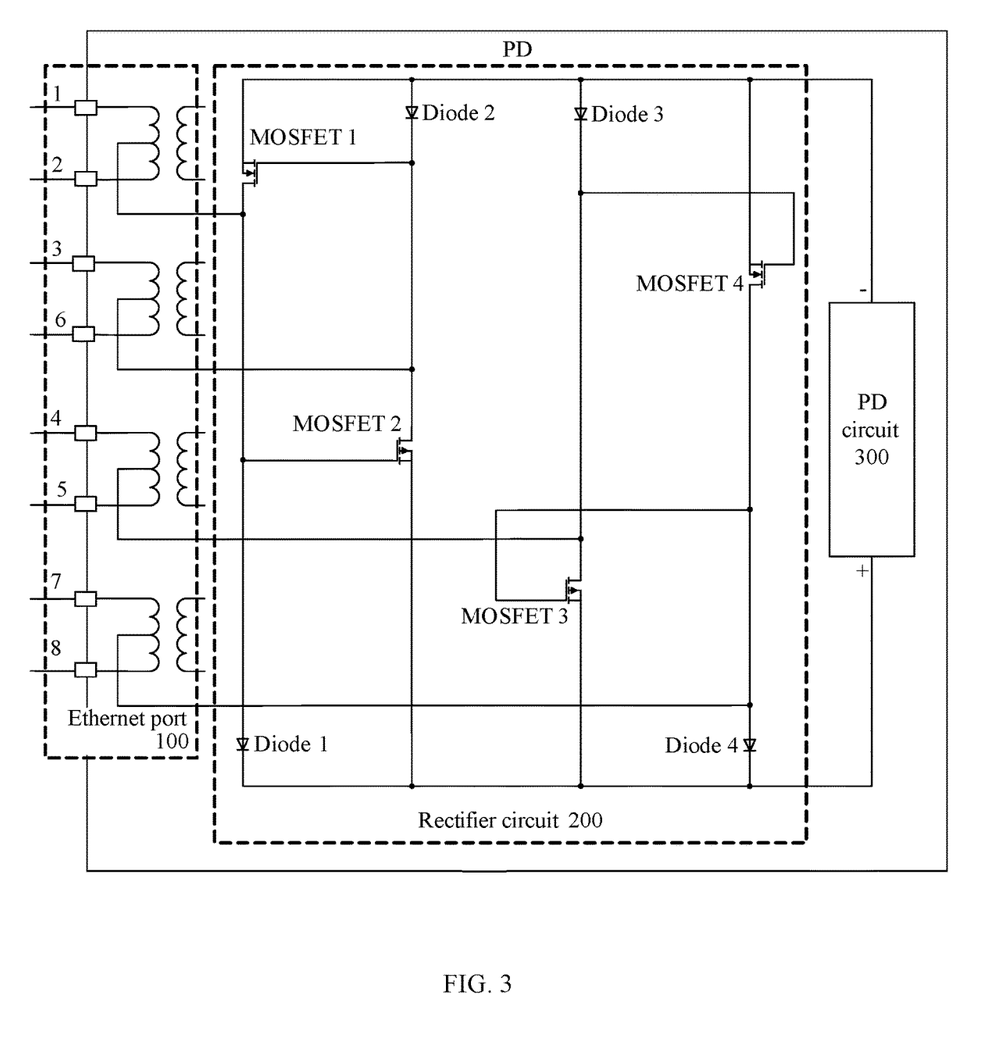
FIG. 3 shows a structure of a PD according to an embodiment of the disclosure.

FIG. 3 shows a structure of a PD according to an embodiment of the disclosure. The PD includes an Ethernet port 100, a rectifier circuit 200, and a PD circuit 300. The Ethernet port 100 includes a first contact pair 1-2, a second contact pair 3-6, a third contact pair 4-5, and a fourth contact pair 7-8. The first contact pair 1-2 is configured to connect to a cable pair 1-2 of an Ethernet cable. The second contact pair 3-6 is configured to connect to a cable pair 3-6 of the Ethernet cable. The third contact pair 4-5 is configured to connect to a cable pair 4-5 of the Ethernet cable. The fourth contact pair 7-8 is configured to connect to a cable pair 7-8 of the Ethernet cable.

The rectifier circuit 200 includes four MOSFETs. That the rectifier circuit 200 includes four MOSFETs means that the quantity of MOSFETs in the rectifier circuit 200 is four. The rectifier circuit 200 further includes at least four diodes. The four MOSFETs are a first MOSFET, a second MOSFET, a third MOSFET, and a fourth MOSFET. The first MOSFET, the second MOSFET, the third MOSFET, and the fourth MOSFET are a MOSFET 1, a MOSFET 2, a MOSFET 3, and a MOSFET 4 in FIG. 3. In FIG. 3, the MOSFET 1 is an N-type MOSFET. The MOSFET 2 is a P-type MOSFET. The MOSFET 3 is a P-type MOSFET. The MOSFET 4 is an N-type MOSFET. In an implementation, an additional drive circuit may be designed for the MOSFET 2 and/or the MOSFET 3, and an N-type MOSFET is used as the MOSFET 2 and/or the MOSFET 3. In an implementation, an additional drive circuit may be designed for the MOSFET 1 and/or the MOSFET 4, and a P-type MOSFET is used as the MOSFET 1 and/or the MOSFET 4.

The at least four diodes in the rectifier circuit 200 include a first diode, a second diode, a third diode, and a fourth diode. The first diode, the second diode, the third diode, and the fourth diode are a diode 1, a diode 2, a diode 3, and a diode 4 in FIG. 3.

The PD circuit 300 includes at least one PD chip. The PD chip is configured to implement a PD function in processes such as PoE detection and classification. The PD circuit 300 may further include a direct current-direct current (DC-DC) convertor. The PD circuit may further include PD load. A power input positive electrode of the PD circuit 300 receives a high electric potential, and a power input negative electrode of the PD circuit 300 receives a low electric potential.

The first contact pair 1-2 is connected to an anode of the diode 1, and is connected to a drain electrode of the MOSFET 1. The second contact pair 3-6 is connected to a cathode of the diode 2, and is connected to a drain electrode of the MOSFET 2. The third contact pair 4-5 is connected to a cathode of the diode 3, and is connected to a drain electrode of the MOSFET 3. The fourth contact pair 7-8 is connected to an anode of the diode 4, and is connected to a drain electrode of the MOSFET 4. In an implementation, a source electrode and a drain electrode of one or more MOSFETs may be exchanged.

A cathode of the diode 1, a source electrode of the MOSFET 2, a source electrode of the MOSFET 3, and a cathode of the diode 4 are connected to each other, and are connected to the power input positive electrode of the PD circuit 300. A source electrode of the MOSFET 1, an anode of the diode 2, an anode of the diode 3, and a source electrode of the MOSFET 4 are connected to each other, and are connected to the power input negative electrode of the PD circuit 300.

A gate electrode of the MOSFET 1 is connected to the second contact pair 3-6. A gate electrode of the MOSFET 2 is connected to the first contact pair 1-2. A gate electrode of the MOSFET 3 is connected to the fourth contact pair 7-8. A gate electrode of the MOSFET 4 is connected to the third contact pair 4-5. In other words, in the foregoing structure, a gate electrode of a MOSFET connected to each contact pair is connected to the other contact pair in a same contact group as the contact pair, and a voltage of the gate electrode is controlled by an electric potential of the other contact pair. If a PoE supply voltage is greater than a voltage that the gate electrode of the MOSFET can bear, the gate electrode of the MOSFET is connected to the other contact pair by using a control circuit. The control circuit outputs a suitable electric potential to the gate electrode of the MOSFET based on an electric potential difference between the two contact pairs, to turn on or cut off the MOSFET. In FIG. 3, a connecting point between a gate electrode of a MOSFET connected to a contact pair and the other contact pair in a same contact group as the contact pair is located between a diode and a MOSFET that are connected to the other contact pair. In FIG. 3, the connecting point between the gate electrode of the MOSFET connected to the contact pair and the other contact pair in the same contact group as the contact pair may alternatively be located between the MOSFET connected to the other contact pair and the PD circuit 300.

FIG. 3 shows only a structure of the rectifier circuit in this embodiment of the disclosure. In addition to the MOSFETs, some components, for example, a capacitor, a resistor, a diode, a bipolar junction transistor (BJT), and a breakover diode, may be added to the rectifier circuit. The rectifier circuit of the PD in FIG. 3 includes only four MOSFETs, and therefore costs of the rectifier circuit are lower than that of a full-MOSFET rectifier circuit.

If an electric potential of the cable pair 1-2 is lower than that of the cable pair 3-6, an electric potential of the first contact pair 1-2 is lower than that of the second contact pair 3-6. Because the MOSFET 1 is an N-type MOSFET, the high electric potential of the second contact pair 3-6 may make an electric potential of the gate electrode of the MOSFET 1 higher than that of the source electrode of the MOSFET 1, so as to turn on the MOSFET 1. Because the MOSFET 2 is a P-type MOSFET, the low electric potential of the first contact pair 1-2 may make an electric potential of the gate electrode of the MOSFET 2 lower than that of the source electrode of the MOSFET 2, so as to turn on the MOSFET 2. In addition, the electric potential of the first contact pair 1-2 is lower than that of the second contact pair 3-6, and therefore the diode 1 and the diode 2 are cut off. A current flows from the second contact pair 3-6 to the first contact pair 1-2 after sequentially passing through the MOSFET 2, the PD circuit 300, and the MOSFET 1.

If an electric potential of the cable pair 7-8 is lower than that of the cable pair 4-5, an electric potential of the fourth contact pair 7-8 is lower than that of the third contact pair 4-5. Because the MOSFET 4 is an N-type MOSFET, the high electric potential of the third contact pair 4-5 may make an electric potential of the gate electrode of the MOSFET 4 higher than that of the source electrode of the MOSFET 4, so as to turn on the MOSFET 4. Because the MOSFET 3 is a P-type MOSFET, the low electric potential of the fourth contact pair 7-8 may make an electric potential of the gate electrode of the MOSFET 3 lower than that of the source electrode of the MOSFET 3, so as to turn on the MOSFET 3. In addition, the electric potential of the fourth contact pair 7-8 is lower than that of the third contact pair 4-5, and therefore the diode 3 and the diode 4 are cut off. A current flows from the third contact pair 4-5 to the fourth contact pair 7-8 after sequentially passing through the MOSFET 3, the PD circuit 300, and the MOSFET 4.

Because the current passes through only two MOSFETs but does not pass through a diode, if the electric potential of the cable pair 1-2 is lower than that of the cable pair 3-6, and the electric potential of the cable pair 7-8 is lower than that of the cable pair 4-5, a loss of the rectifier circuit of the PD shown in FIG. 3 is lower than that of the PD shown in FIG. 2. If the electric potential of the cable pair 1-2 is higher than that of the cable pair 3-6 or the electric potential of the cable pair 7-8 is higher than that of the cable pair 4-5, MOSFETs are cut off, corresponding diodes are turned on, and a current passes through two diodes. Although there is no advantage in terms of a power loss, the PD can still work normally in this scenario.

If the PD is a type-4 PD, then the PSE is a type-4 PSE. The type-4 PSE definitely uses the cable pair 1-2 and the cable pair 7-8 for providing a low electric potential. Therefore, the structure of the PD is particularly suitable for the type-4 PD.

If the PSE uses only one cable pair group at a detection or classification stage to send a detection or classification voltage, the PSE should not receive, from another cable pair group, a voltage that is sufficient to affect a detection or classification result. For example, if the PSE provides a negative electric potential by using the cable pair 1-2 and uses the cable pair 3-6 as a backflow cable pair, the MOSFET 1 is turned on. If the cable pair 4-5 and the cable pair 7-8 in the PSE are floating, the PSE does not receive a voltage from a group including the cable pair 4-5 and the cable pair 7-8. However, if the cable pair 4-5 is connected to a backflow end in the PSE, the high electric potential of the cable pair 4-5 makes the MOSFET 4 turned on, and the turned-on MOSFET 4 guides a low electric potential to the cable pair 7-8. Therefore, the PSE receives a voltage from the group including the cable pair 4-5 and the cable pair 7-8. The voltage may be referred to as a reflected voltage. The reflected voltage may cause a detection or classification error.

Because detection or classification is completed when the PSE supplies power, even if the group including the cable pair 4-5 and the cable pair 7-8 receives the reflected voltage, detection or classification is not affected. The reflected voltage does not damage the PSE. Therefore, a control circuit may be added to a gate electrode of each MOSFET.

These control circuits are used for turning on the MOSFETs only when a voltage of a contact group is less than a voltage threshold. The MOSFETs are not turned on when the voltage of the contact group is greater than the voltage threshold. When the voltage of the contact group is equal to the voltage threshold, processing is performed according to one of the foregoing cases. Because a negative electric potential is usually used for power supply in PoE, the voltage threshold is negative. That the voltage of the contact group is less than the voltage threshold means that an absolute value of the voltage of the contact group is greater than that of the voltage threshold. Because a classification error usually does not generate a serious problem, the voltage threshold may be between a maximum PoE detection voltage and a minimum PoE supply voltage. In other words, the absolute value of the voltage threshold is greater than that of the maximum PoE detection voltage and less than or equal to that of the minimum PoE supply voltage. The absolute value of the voltage threshold may alternatively be greater than that of a maximum PoE classification voltage. Voltage thresholds of the control circuits may be the same or may be different, as long as the values are between the maximum PoE detection voltage and the minimum PoE supply voltage.

Figure 4:
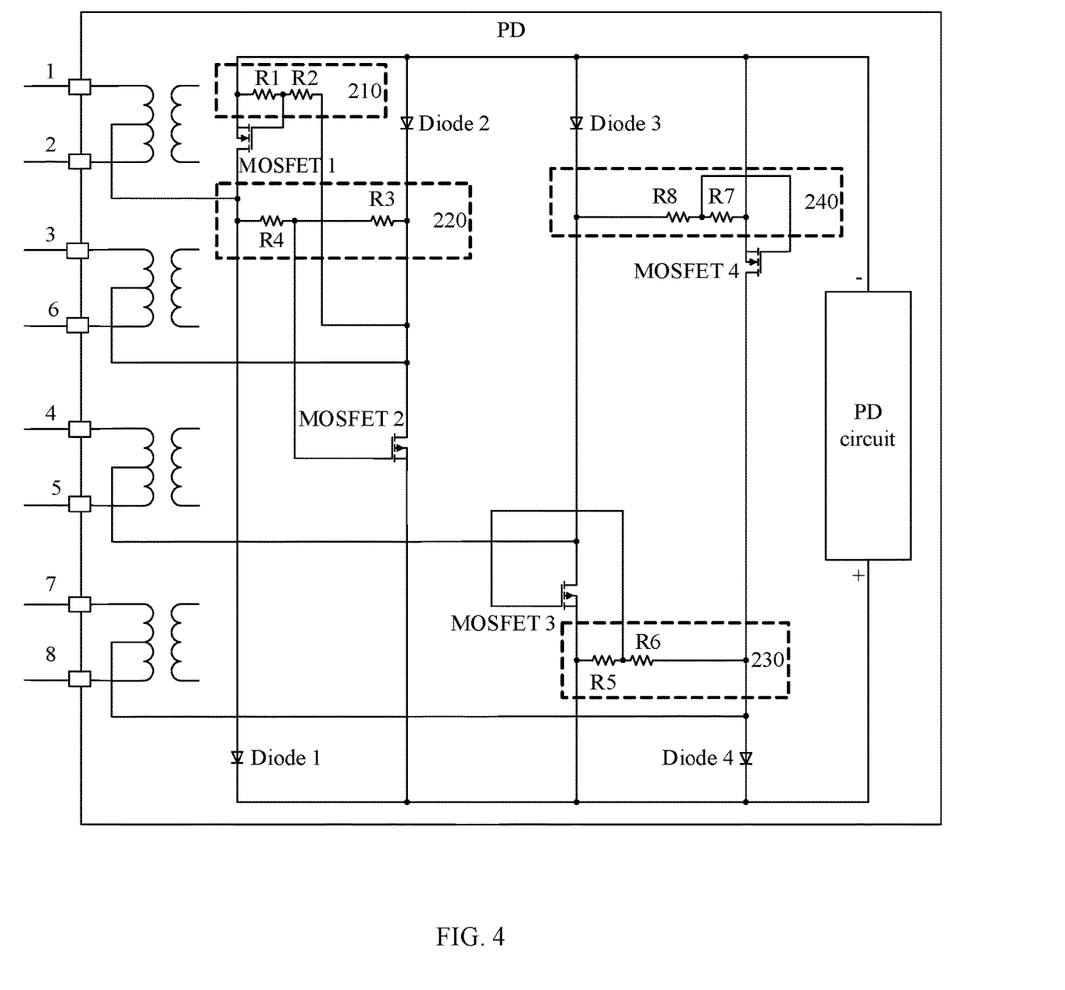
FIG. 4 shows another structure of a PD according to an embodiment of the disclosure.

For example, FIG. 4 shows a structure of a PD according to an embodiment of the disclosure. In FIG. 4, two resistors that are connected in series between a pair of contacts are used as a control circuit. A MOSFET in FIG. 4 is a power MOSFET.

A control circuit 210 includes a resistor R1 and a resistor R2. Resistance values of the resistor R1 and the resistor R2 satisfy the following conditions: $R1*V_D/(R1+R2)<V_{th1}$, and $R1*V_{PoE}/(R1+R2)>V_{th1}$, where $V_D$ is an absolute value of a maximum PoE detection voltage; $V_{PoE}$ is an absolute value of a minimum PoE supply voltage; and $V_{th1}$ is a critical voltage of a MOSFET 1.

A control circuit 220 includes a resistor R3 and a resistor R4. Resistance values of the resistor R3 and the resistor R4 satisfy the following conditions: $R3*V_D/(R3+R4)<V_{th2}$, and $R3*V_{PoE}/(R3+R4)>V_{th2}$, where $V_{th2}$ is a critical voltage of a MOSFET 2.

A control circuit 230 includes a resistor R5 and a resistor R6. Resistance values of the resistor R5 and the resistor R6 satisfy the following conditions: $R5*V_D/(R5+R6)<V_{th3}$, and $R1*V_{PoE}/(R5+R6)>V_{th3}$, where $V_{th3}$ is a critical voltage of a MOSFET 3.

A control circuit 240 includes a resistor R7 and a resistor R8. Resistance values of the resistor R7 and the resistor R8 satisfy the following conditions: $R7*V_D/(R7+R8)<V_{th4}$, and $R7*V_{PoE}/(R7+R8)>V_{th4}$, where $V_{th4}$ is a critical voltage of a MOSFET 4.

During detection, the MOSFET 1 and the MOSFET 4 are not turned on. However, a power MOSFET usually includes a parasitic body diode. An anode of the body diode is a source electrode of the power MOSFET, and a cathode of the body diode is a drain electrode of the power MOSFET. A detection current may flow through a body diode of the MOSFET 1. A source electrode of the MOSFET 4 is connected to a low electric potential point, and therefore the detection current does not flow through the MOSFET 4. Although a loss is increased because the MOSFET 1 is not turned on, a purpose of detection at a detection stage is detecting an effective PD but not providing power supply, and therefore the loss does not cause a negative effect as long as a detection result is not affected. Similarly, a detection operation on a group including contacts 4, 5, 7, and 8 may also be correctly performed.

The foregoing requirements on the control circuit 230 and control circuit 240 may alternatively be omitted, because the detection result is not affected even if the MOSFET 2 and the MOSFET 3 are turned on when a contact pair 1-2 receives a detected electric potential. In addition, if a contact pair 3-6 or a contact pair 4-5 receives a low electric potential, a detection current flows through a diode. Therefore, designs of control circuits of the MOSFET 2 and the MOSFET 3 may be different from designs of control circuits of the MOSFET 1 and the MOSFET 4.

Figure 5:
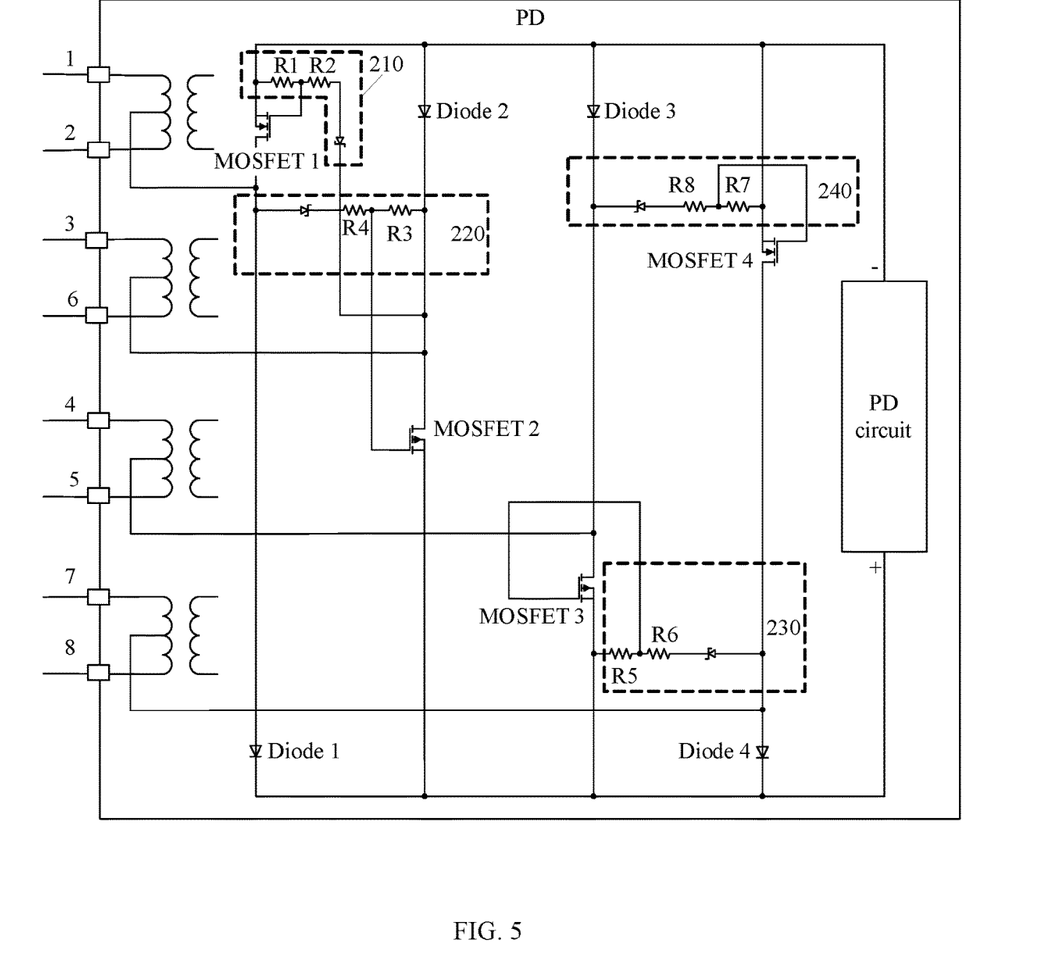
FIG. 5 shows still another structure of a PD according to an embodiment of the disclosure.

For another example, FIG. 5 shows another structure of a PD according to an embodiment of the disclosure. In FIG. 5, a combination of a resistor and a breakover diode is used as a control circuit. A suitable breakover diode is selected during design of the PD. For example, the breakover diode may be a Zener diode or an avalanche diode. A breakdown voltage of the breakover diode is the foregoing voltage threshold. In this way, only when there is a negative electric potential of a PoE power supply level on a cable pair 1-2 or a cable pair 7-8, a control circuit 210 and a control circuit 240 respectively turn on a MOSFET 1 and a MOSFET 4.

The control circuit in FIG. 5 includes a resistor, to prevent a MOSFET from being damaged by an excessively high electric potential on a gate electrode. If the MOSFET can bear a maximum PoE power supply voltage (for example, −57 volts (V)), the resistor in the control circuit may be omitted.

Based on a cause the same as that in the foregoing, although breakover diodes are added to a control circuit 220 and a control circuit 230 in FIG. 5, the two breakover diodes may be omitted.

FIG. 4 and FIG. 5 show only two possible implementations of a control circuit. The control circuit may further include other components, for example, a capacitor, a diode, and a BJT.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A powered device (PD) comprising:
   an Ethernet port comprising:
      a first contact pair configured to connect to a cable pair 1-2 of an Ethernet cable,
      a second contact pair configured to connect to a cable pair 3-6 of the Ethernet cable,
      a third contact pair configured to connect to a cable pair 4-5 of the Ethernet cable, and
      a fourth contact pair configured to connect to a cable pair 7-8 of the Ethernet cable;
   a rectifier circuit comprising:
      a first metal-oxide-semiconductor field-effect transistor (MOSFET) comprising a first end connected to the first contact pair, a second end, and a first gate electrode connected to the second contact pair,
      a second MOSFET comprising a third end connected to the second contact pair, a fourth end, and a second gate electrode connected to the first contact pair,
      a third MOSFET comprising a fifth end connected to the third contact pair, a sixth end, and a third gate electrode connected to the fourth contact pair, a fourth MOSFET comprising a seventh end connected to the fourth contact pair, an eighth end, and a fourth gate electrode connected to the third contact pair, a first diode comprising a first anode and a first cathode, wherein the first anode is connected to the first contact pair, a second diode comprising a second anode and a second cathode, wherein the second cathode is connected to the second contact pair, a third diode comprising a third anode and a third cathode, wherein the third cathode is connected to the third contact pair, and a fourth diode comprising a fourth anode and a fourth cathode, wherein the fourth anode is connected to the fourth contact pair;

wherein the first MOSFET, the second MOSFET, the third MOSFET, and the fourth MOSFET are the only MOSFETS in the rectifier circuit; and a PD circuit comprising:

a power input positive electrode connected to the fourth end, the sixth end, the first cathode, and the fourth cathode, and a power input negative electrode connected to the second end, the eighth end, the second anode, and the third anode.

2. The PD of claim 1, wherein the first MOSFET is an N-type MOSFET, wherein the second MOSFET is a P-type MOSFET, wherein the third MOSFET is a P-type MOSFET, and wherein the fourth MOSFET is an N-type MOSFET.

3. The PD of claim 2, wherein the first end, the third end, the fifth end, and the seventh end are drain electrodes, and wherein the second end, the fourth end, the sixth end, and the eighth end are source electrodes.

4. The PD of claim 3, wherein the rectifier circuit further comprises a first control circuit configured to:

connect the first gate electrode to the second contact pair, turn on the first MOSFET when a first value, obtained by subtracting a first electric potential of the first contact pair from a second electric potential of the second contact pair, is greater than a first voltage threshold, and turn off the first MOSFET when the first value is less than the first voltage threshold, wherein an absolute value of the first voltage threshold is greater than a maximum Power over Ethernet (PoE) detection voltage and less than or equal to a minimum PoE supply voltage.

5. The PD of claim 4, wherein the first control circuit comprises:

a first resistor coupled to the second end and the first gate electrode, and a second resistor coupled to the first resistor, the first gate electrode, and the second contact pair.

6. The PD of claim 5, wherein the first control circuit satisfies a condition $[(R1*V_D)/(R1+R2)]<V_{th1}$, and wherein R1 is a first resistance of the first resistor, $V_D$ is an absolute value of the maximum PoE detection voltage, R2 is a second resistance of the second resistor, and $V_{th1}$ is a first critical voltage of the first MOSFET.

7. The PD of claim 4, wherein the first control circuit comprises:

a first resistor coupled to the second end and the first gate electrode, a second resistor coupled to the first resistor and the first gate electrode, and a first breakover diode coupled to the second resistor and the second contact pair.

8. The PD of claim 7, wherein the first breakover diode is a Zener diode or an avalanche diode.

9. The PD of claim 3, wherein the rectifier circuit further comprises a second control circuit comprising:

a third resistor coupled to the third end and the second gate electrode, and a fourth resistor coupled to the third resistor, the second gate electrode, and the first contact pair.

10. The PD of claim 9, wherein the second control circuit satisfies a condition $[(R3*V_D)/(R3+R4)]<V_{th2}$, and wherein R3 is a third resistance of the third resistor, $V_D$ is an absolute value of a maximum Power over Ethernet (PoE) detection voltage, R4 is a fourth resistance of the fourth resistor, and $V_{th2}$ is a second critical voltage of the second MOSFET.

11. The PD of claim 3, wherein the rectifier circuit further comprises a second control circuit comprising:

a third resistor coupled to the third end and the second gate electrode, a fourth resistor coupled to the third resistor and the second gate electrode, and a second breakover diode coupled to the fourth resistor and the first contact pair.

12. The PD of claim 3, wherein the rectifier circuit further comprises a third control circuit comprising:

a fifth resistor coupled to the sixth end and the third gate electrode, and a sixth resistor coupled to the fifth resistor, the third gate electrode, and the fourth contact pair.

13. The PD of claim 12, wherein the third control circuit satisfies a condition $[(R5*V_D)/(R5+R6)]<V_{th3}$, and wherein R5 is a fifth resistance of the fifth resistor, $V_D$ is an absolute value of a maximum Power over Ethernet (PoE) detection voltage, R6 is a sixth resistance of the sixth resistor, and $V_{th3}$ is a second critical voltage of the second MOSFET.

14. The PD of claim 3, wherein the rectifier circuit further comprises a third control circuit comprising:

a fifth resistor coupled to the sixth end and the third gate electrode, a sixth resistor coupled to the fifth resistor and the third gate electrode, and a third breakover diode coupled to the sixth resistor and the fourth contact pair.

15. The PD of claim 3, wherein the rectifier circuit further comprises a fourth control circuit configured to:

connect the fourth gate electrode to the third contact pair, turn on the fourth MOSFET when a second value, obtained by subtracting a fourth electric potential of the fourth contact pair from a third electric potential of the third contact pair, is greater than a second voltage threshold, and turn off the fourth MOSFET when the second value is less than the second voltage threshold, wherein an absolute value of the second voltage threshold is greater than a maximum Power over Ethernet (PoE) detection voltage and greater than or equal to an absolute value of a minimum PoE supply voltage.

16. The PD of claim 15, wherein the fourth control circuit comprises:

a seventh resistor coupled to the eighth end and the fourth gate electrode, and an eighth resistor coupled to the seventh resistor, the fourth gate electrode, and the third contact pair.

17. The PD of claim 16, wherein the fourth control circuit satisfies a condition $[(R7*V_D)/(R7+R8)]<V_{th4}$, and wherein R7 is a seventh resistance of the seventh resistor, $V_D$ is an absolute value of a maximum Power over Ethernet (PoE)

detection voltage, R8 is an eighth resistance of the eighth resistor, and $V_{th4}$ is a fourth critical voltage of the fourth MOSFET.

18. The PD of claim 15, wherein the fourth control circuit comprises:
   a seventh resistor coupled to the eighth end and the fourth gate electrode,
   an eighth resistor coupled to the seventh resistor and the fourth gate electrode, and
   a fourth breakover diode coupled to the eighth resistor and the third contact pair.

19. The PD of claim 18, wherein the fourth breakover diode is a Zener diode or an avalanche diode.

20. The PD of claim 1, wherein the PD is a type-4 PD.

* * * * *